Dec. 16, 1952 C. G. SONTHEIMER 2,621,517
RESONANCE TYPE CAPACITANCE RESPONSIVE GAUGE
Filed Dec. 14, 1948 2 SHEETS—SHEET 1

FIG. I.

INVENTOR
Carl G. Sontheimer
BY
Robert S. Dunham
ATTORNEY

Dec. 16, 1952   C. G. SONTHEIMER   2,621,517
RESONANCE TYPE CAPACITANCE RESPONSIVE GAUGE
Filed Dec. 14, 1948                                2 SHEETS—SHEET 2

INVENTOR
*Carl G. Sontheimer*
BY
*Robert S. Dunlap*
ATTORNEY

Patented Dec. 16, 1952

2,621,517

UNITED STATES PATENT OFFICE 2,621,517

RESONANCE TYPE CAPACITANCE RESPONSIVE GAUGE

Carl G. Sontheimer, Riverside, Conn., assignor to The Liquidometer Corporation, Long Island City, N. Y., a corporation of Delaware Application December 14, 1948, Serial No. 65,094

25 Claims. (Cl. 73—304)

This invention relates to telemetering systems, and more particularly to systems in which a change in the value of a condition is represented by a change in frequency of an electrical signal which is transmitted to a remotely positioned interpreting device for indicating the value of the condition.

Such a system is useful in aircraft, for example, to inform the pilot or other operating personnel of the amount of fuel in each tank of the aircraft. In one type of apparatus already in use the change in capacity of a condenser, mounted within the gasoline tank, is interpreted as a measure of the quantity of fuel in the tank. The condenser may be arranged, for example, with its opposed separated plates extending vertically within the tank and substantially from the bottom to the top thereof, so that the capacitance of the condenser is a function of the depth of fuel in the tank. This is possible, of course, because the capacitance depends upon the dielectric constant of the insulating medium between the plates of the condenser, gasoline, for example, having a dielectric constant of approximately two and the dielectric constant of air being one. Therefore, when the air between the condenser plates is replaced by gasoline, the capacity of the condenser increases by a factor of two, with proportional changes taking place when the gasoline only partially fills the space between the plates of the condenser.

Various types of fuel gauges based upon this principle have been utilized for measuring the contents of such tanks, but have not been entirely satisfactory, the relatively simple arrangements failing to provide the desired accuracy and reliability, and the more complex systems being undesirable because of cost and weight considerations. For example, considerable error may be introduced in the measurements by the wires or cables which connect the condenser in the fuel tank with the measuring and indicating apparatus in the fuselage.

These cables are often subject to wide variations in ambient conditions as, for example, temperature, humidity, etc., which cause variations in the shunt capacity of the cables, which, in the usual arrangements of such measuring devices, is added directly to the capacity of the measuring condenser. The error caused by such capacity changes is particularly important where relatively long cables are required, in which case the shunt capacity of the cable itself may even be greater than the capacity variation of the condenser used in the tank. The use of rigid conductors or cables in an effort to overcome such variations usually is not satisfactory, particularly where cost, weight and servicing are important considerations.

In accordance with the present invention, the series resonant frequency of an electrical circuit positioned at the point of measurement, and which contains an element responsive to changes in the measured condition, controls the frequency of a signal generator which drives a discriminator to provide an indication of the measured value in accordance with the frequency of the signal generator.

Accordingly, it is an object of the present invention to provide a simple telemetering system of increased accuracy and reliability.

Another object is to minimize the errors introduced into such a system by changes in external conditions.

Another object is to provide such a system in which the accuracy of the reading is substantially independent of variations in the characteristics of the cable connecting a remotely-positioned condition-responsive reactance element with the measuring apparatus.

A further object is to decrease the errors in such a system caused by changes in shunt capacity or leakage resistance of the cable carrying the information. It is a particular object to decrease errors caused by changes in ambient conditions such as humidity and temperature.

Still another object is to provide an improved system for measuring the value of a reactance element, which value is arranged to be a function of a predetermined condition.

Still another object of the invention is to provide improved apparatus for indicating visually or recording the measured value.

The above and other objects and advantages will appear more fully hereinafter from consideration of the following description taken in conjunction with the accompanying drawings in which:

Figure 1:
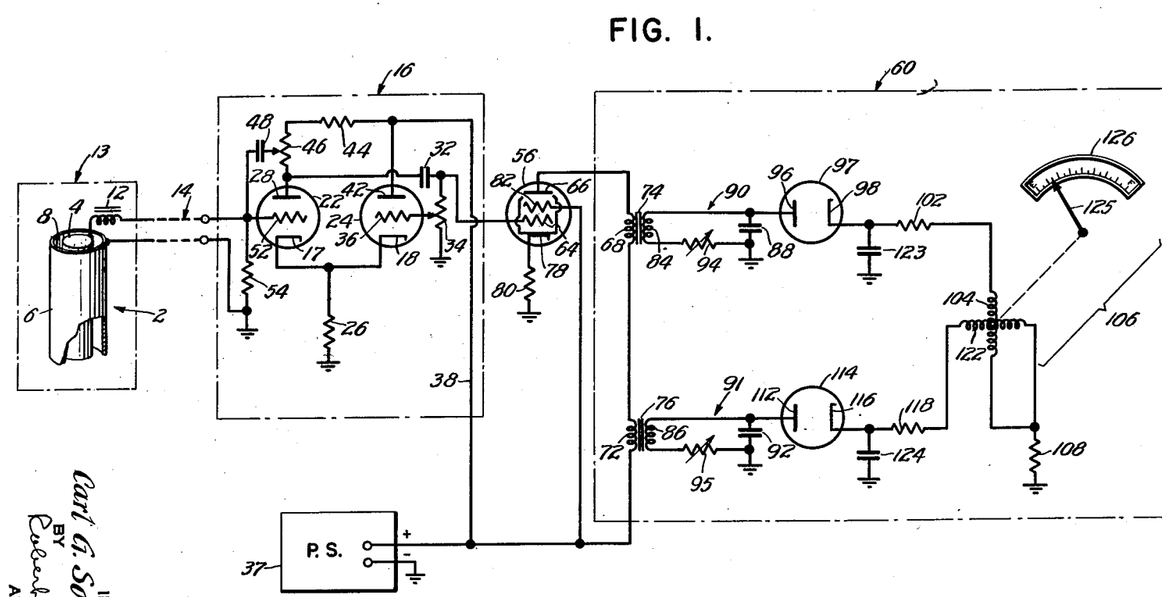
Figure 1 illustrates diagrammatically a measuring system embodying the invention.

As shown in Figure 1, the present invention is embodied in a capacity type measuring system such as might be used for indicating the amount of fuel in a gasoline tank of an airplane. It is to be understood, however, that the invention is equally applicable to other applications in which the value of a reactance element can be made a function of the condition which is to be measured.

A condenser, generally indicated at 2 (Fig. 1) includes a first plate in the form of an inner cylinder 4, formed of metal or other conducting material, and a second plate 6 in the form of an outer cylinder coaxial with and spaced from the first plate 4. The inner plate 4 is insulated from the tank and from the condenser plate 6, which latter plate may be grounded conveniently to the frame of the aircraft. This condenser is arranged to extend vertically within the gasoline tank (not shown); the plates 4 and 6 being arranged so that the gasoline will rise in the space 8 between the condenser plates in accordance with the depth of the gasoline in the tank. The resulting variation in capacity may be utilized as a measure of the amount of fuel in the tank.

This capacity might be determined by measuring, for example, the amount of alternating current which will flow through the condenser 2, the current being a direct function of the capacity. However, if the electric current utilized for such a measurement must pass also along the cable which connects the measuring apparatus with the condenser, the shunt capacity of the cable will be in parallel with the condenser 2, and changes in the capacity of the connecting cable may cause serious errors in the measurement.

In order to overcome this difficulty and to provide a system having inherently high accuracy, an inductor 12 is positioned near the condenser 2 and is connected in series therewith to form a series resonant circuit, generally indicated at 13 which is connected by a cable 14 to a remotely-positioned variable frequency oscillator, generally indicated at 16. This variable frequency oscillator 16 is arranged to oscillate at the series resonant frequency of condenser 2 and inductor 12, this frequency, of course, being a function of the capacity of condenser 2. The indication of the fuel content of the tank is obtained by measuring the frequency generated by the oscillator 16.

At the series resonant frequency of these reactance elements 2 and 12, which are located at the end of cable 14, their total impedance reduces substantially to zero. Thus, the frequency at which the impedance of the cable 14 and the circuit at the measuring tank presents minimum impedance to the variable frequency oscillator is substantially unaffected by changes either in the shunt capacity or leakage resistance of the cable 14. This characteristic is utilized, as will be explained below, to render the measurements substantially independent of the characteristics of the cable.

In order that the frequency generated by oscillator 16 will be controlled by the resonant frequency of inductor 12 and condenser 2, both positive and negative feedback are provided, the positive feedback being substantially independent of frequency over the desired operating range and the magnitude of the negative feedback being controlled by the series resonant circuit including condenser 2.

In order to provide the positive feedback, cathodes 17 and 18 of triode vacuum tubes 22 and 24, respectively, are connected to ground through a common bias resistor 26, and the anode 28 of tube 22 is coupled by means of a coupling condenser 32 and a potentiometer type resistance element 34 to a control grid 36 of tube 24. Anode voltage is provided from a conventional type power supply 37, through a lead 38, directly to anode 42 of tube 24, and through resistor 44 and potentiometer type resistance element 46 to anode 28 of tube 22. With this arrangement, an increase in plate current through tube 22 causes a reduction in the plate current of tube 24 which, in turn, decreases the bias voltage developed across the common cathode resistance 26, thus, tending to increase further the anode current of tube 22. This positive feedback tends to cause the circuit to oscillate continuously.

However, this positive feedback is opposed by a negative feedback circuit which is connected from the variable tap of potentiometer 46 through a condenser 48 to a control grid 52 of tube 22, this grid being connected to ground through cable 14 and the series connection of inductor 12 and condenser 2, with a parallel direct current path being provided through a grid return resistor 54. The tendency of this portion of the circuit is to prevent oscillation.

The reactance of the series-connected condenser 2 and inductor 12 is high at non-resonant frequencies, but decreases rapidly near the series resonant frequency. Thus, it is apparent that the negative feedback voltage, which is applied from anode 28 to control grid 52, depends upon the division of voltage between the condenser 48 and the series resonant circuit 13 at the fuel tank. Thus, potentiometer 46 can be adjusted so that for those frequencies at which the series circuit 13 is non-resonant, the negative feedback voltage applied to grid 52 is such as to prevent oscillation, whereas at the series resonant frequency the voltage that can be developed across the low impedance of the series resonant circuit 13 is insufficient to prevent oscillation, which accordingly occurs at that frequency.

Thus, an alternating signal is generated, the frequency of which is a function of the amount of fuel in the tank, so that it is only necessary to provide an indicator responsive to changes in frequency, and to calibrate it in terms of the actual fuel contents of the tank. An amplifier tube 56 and a discriminator circuit, generally indictaed at 60 in Figure 1, are employed for this purpose.

The beam type vacuum tube 56 serves to increase the power of the alternating signal generated by oscillator 16 and to isolate the discriminator circuit from the oscillator. Tube 56 is connected in conventional manner, the signal from oscillator 16 being applied to a control grid 64 and the anode 66 being connected to the positive voltage of power supply 37 through series-connected primaries 68 and 72 of discriminator transformers 74 and 76, respectively. The cathode 78 of tube 56 is returned to ground through a bias resistor 80, and screen grid 82 is connected directly to the source of positive voltage.

Secondary windings 84 and 86 of transformers 74 and 76, respectively, are connected in parallel with capacitors 88 and 92, respectively, to form two parallel resonant circuits, generally indicated at 90 and 91. Circuit 90 is resonant near the highest operating frequency of the oscillator 16, and the circuit 91 is resonant near the lower end of the frequency range of the oscillator. Variable resistors 94 and 95 are included in these circuits for adjustment purposes and will be explained below.

The signal voltage developed across condenser 88 is applied between ground and anode 96 of a diode rectifier 97, the cathode 98 of which is connected to ground through a filter resistor 102, a meter actuating or deflecting coil 104 of a ratiometer, generally indicated at 106, and resistor 108. The voltage developed across condenser 92 is applied between ground and anode 112 of a diode 114, the cathode 116 of which is connected through a filter resistor 118, actuating or deflecting coil 122 of the ratiometer 106, and resistor 108 to ground. Condensers 123 and 124 are connected between cathodes 98 and 116, respectively, and ground to filter alternating components from the rectified signals.

The ratiometer 106 may be of conventional design with the deflecting coils 122 and 104 positioned at right angles to each other and connected to move a pointer or indicator hand 125, which is arranged to cooperate with a scale 126. The pointer 125 may be arranged to indicate at mid-scale when the current through coils 104 and 122 are equal, and to move in one direction when the current through coil 104 is greater than that through coil 122, and to move in the opposite direction when the current through coil 122 is greater. The direct currents through these coils depend, of course, upon the alternating voltages developed across condensers 88 and 92, and it is the ratio of these voltages that determines the reading on the scale 126. This ratio depends in turn upon the frequency generated by the oscillator 16.

In order to increase the scale movement of pointer 125, resistor 108 is connected in common with the cathode circuits of both diode tubes 97 and 114. With this arrangement, as the current through one of the diodes becomes larger than the current through the other diode, resistor 108 places a positive bias on the cathode of the tube drawing the lesser current, further reducing the current through that tube and increasing the ratio of the two currents and, thus increasing the movement of the pointer 125.

In order to permit easy adjustment of the apparatus the variable resistors 94 and 95 are privided for independent adjustment of the Q of the high and low frequency discriminator circuits 90 and 91, respectively. The resistor 95 is adjusted so that the pointer 125 indicates correctly when the fuel tank is full, and resistor 94 is adjusted so that pointer 125 indicates correctly when the tank is empty.

Figure 2:
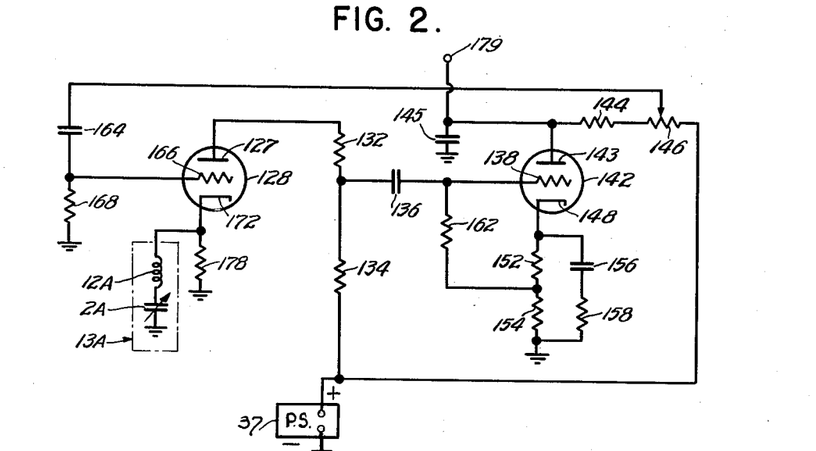
Figures 2, 3 and 4 illustrate alternative variable frequency oscillator arrangements which may be substituted for the variable frequency oscillator embodied in the system shown in Figure 1.

Figure 2 shows an alternative variable frequency oscillator arrangement in which the anode 127 of a triode tube 128 is connected to a positive source of voltage through plate load resistors 132 and 134, and is coupled through a condenser 136, which is connected between resistors 132 and 134, to a control grid 138 of a triode vacuum tube 142. The anode 143 of this tube is coupled to ground through a by-pass condenser 145 of low value and connected through plate load resistor 144 and potentiometer type resistor 146 to the source of positive voltage. Cathode 148 of tube 142 is connected to ground through series resistors 152 and 154 which are in shunt with series-connected capacitor 156 and resistor 158. A grid return resistor 162 is connected between grid 138 and a point between resistors 152 and 154.

Positive feedback in this circuit is provided through a coupling condenser 164, which is connected between the movable tap of potentiometer 146 and a control grid 166 of tube 128.

A grid return resistor 168 is connected between control grid 166 and ground. Cathode 172 of tube 128 is connected to ground through a bias resistor 178. Because this bias resistor 178 is not by-passed, its degenerative action provides the negative feedback which prevents oscillation at all frequencies except that at which the series tank unit 13A, comprising inductance 12A and capacitor 2A, is resonant. At resonance the series impedance of this inductance-capacitance combination is low with respect to resistor 178 so that the degenerative action and, thus, the negative feedback is sufficiently reduced that oscillation takes place at this frequency.

The frequency determining device can be coupled, for example, to terminal 179, which is connected to anode 143 of tube 142.

Figure 3:
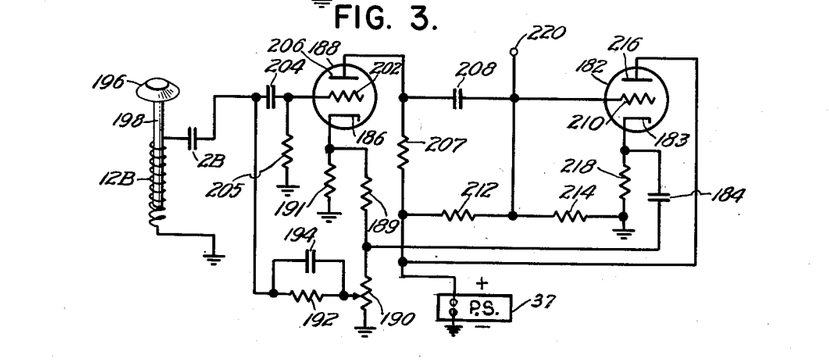

Still another arrangement is indicated in Figure 3, in which positive feedback voltage is obtained from a cathode-follower tube 182 and is fed back from cathode 183 through a condenser 184 to a cathode 186 of a triode tube 188, the voltage being applied to cathode 186 by means of a connection between a resistance 189 and a potentiometer type resistance element 190 connected in series between cathode 186 and ground. A cathode bias resistor 191 is connected in parallel with this arrangement from cathode 186 to ground.

The negative feedback voltage is developed across a voltage-divider circuit comprising a resistor 192, with a capacitor 194 (for the purpose of suppressing spurious modes of oscillation) in parallel therewith, and the series resonant measuring circuit comprising capacitor 2B and inductor 12B; this voltage-divider circuit extends between the variable tap of potentiometer 190 and ground.

In this example, it is the inductor 12B which is responsive to the liquid level. This is accomplished, for example, by a float 196 which is connected to a permeable core 198, which is arranged to move into and out of the coil 12B as the float 196 raises and lowers in response to changes in liquid level.

Grid 202 of tube 188 is connected through condenser 204 to a point between condenser 2B and resistor 192, a D.-C. return path being provided through a grid resistor 205. With this arrangement, the low impedance of the series resonant circuit reduces the negative feedback at its resonant frequency and permits oscillation at that frequency.

The anode 206 of tube 188 is connected to a positive voltage source through a load resistor 207 and is coupled through a condenser 208 to control grid 210 of tube 182. Positive bias is applied to grid 210 by means of a voltage-divider circuit comprising two resistors 212 and 214 connected between the positive voltage source and ground, the grid 210 being connected to the junction of these resistors. Anode 216 of cathode follower tube 182 is connected directly to the source of positive voltage, and cathode 183 of this tube is connected to ground through a cathode load resistor 218. The frequency determining device can be coupled, for example, to terminal 220, which is connected to grid 210 of tube 182.

Figure 4:
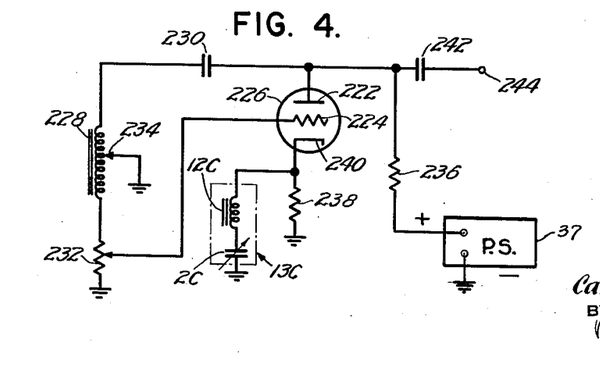

Figure 4 shows still another oscillator arrangement in which the positive feedback from anode 222 to control grid 224 of vacuum tube 226 is obtained by means of an auto-transformer 228, one end of which is coupled to anode 222 through a condenser 230, and the opposite end of which is connected to ground through a potentiometer type resistance element 232. The adjustable tap of potentiometer 232 is connected to control grid 224. The auto-transformer 228 is provided with an adjustable tap 234 which is connected to ground. Anode 222 is connected to the positive voltage source through a load resistor 236.

The negative feedback effect is obtained by the use of a cathode resistance 238 which is not by-passed, connected between cathode 240 and ground, in a manner similar to that described in connection with Figure 2. The series resonant circuit 13C, comprising inductor 12C and condenser 2C, is connected in shunt with cathode resistor 238 to supress the negative feedback and permit oscillation at the resonant frequency. The frequency determining device can be coupled, for example, to anode 222 through a condenser 242 by means of a terminal 244.

The above-described system will be seen to provide a simple, accurate and reliable measuring system in accordance with the objectives of the present invention, but it is to be understood that for particular applications, various alternative arrangements may be employed without exceeding the scope of the invention. For example, the variable frequency oscillators disclosed herein are simple and convenient to use, but where the occasion requires other devices capable of determining the series resonant frequency of inductor 12 and condenser 2 may be used. In a similar manner, the discriminator shown herein is exemplary, and it is to be understood that other forms of devices responsive to changes in frequency may be employed when necessary or desirable.

It is to be pointed out further that individual novel features of the present invention may be useful without a corresponding use of other features, and that such features are in themselves within the scope of the invention as set forth in the following claims.

I claim:

1. Apparatus for indicating at a remote point the magnitude of a condition which is effective to vary the reactance of a reactance element, comprising a first variable reactance element located adjacent to the condition to be measured and responsive to changes in the magnitude of said condition, a second reactance element of opposite sign from and connected in series with said first reactance element and having a fixed value and positioned near said first reactance element remote from the place where the magnitude of the condition is to be indicated, an indicator positioned remotely with respect to said elements, circuit means including variable frequency generating means, the output frequency of which is responsive to the series-resonant frequency of said first and second reactance elements for electrically controlling said indicator in accordance with the series-resonant frequency of said reactance elements, and a cable connecting said series-connected first and second elements to said circuit means, so that conditions affecting the electrical characteristics of said cable will not interfere substantially with the accuracy of the indication of the magnitude of the condition by said indicator.

2. Apparatus as described in claim 1, wherein said first reactance element is a capacitor and said second reactance element is an inductor.

3. Apparatus as described in claim 1, wherein said first reactance element is an inductor and said second reactance element is a capacitor.

4. Apparatus for indicating the magnitude of a condition which will be effective to vary the impedance of an electric circuit including a measuring circuit comprising a variable capacitive reactance element responsive to changes in the magnitude of the condition, a fixed inductive reactance element positioned closely adjacent to said variable capacitive element, oscillating means disposed remote from said capacitive and said inductive elements and connected thereto by conductors connecting said capacitive and said inductive elements in series, the connection between said fixed reactance element and said variable capacitive element being short as compared with the length of said conductors so as to minimize line losses at this point, oscillation suppression means incorporating said reactance elements connected in circuit with said oscillating means for restricting the frequency of oscillation thereof to the series resonant frequency of said reactance elements, and a discriminator circuit connected to the oscillating means responsive to the frequency generated therein, said frequency being a measure of the magnitude of the condition.

5. Apparatus for indicating the magnitude of a condition which will be effective to vary the impedance of an electric circuit including a measuring circuit comprising a variable inductive reactance element responsive to changes in the magnitude of the condition, a fixed capacitive reactance element positioned closely adjacent to said variable inductive element, oscillating means disposed remote from said reactance elements and connected thereto by conductors connecting said inductive and said capacitive elements in series, the connection between said fixed capacitive reactance element and said variable inductive element being short as compared with the length of said conductors connecting said elements jointly with said oscillating means, so as to minimize line losses at this point, oscillation suppression means incorporating said reactance elements connected in circuit with said oscillating means for restricting the frequency of oscillation thereof to the series resonant frequency of said reactance elements, and a discriminator circuit connected to the oscillating means responsive to the frequency generated therein, said frequency being a measure of the magnitude of the condition.

6. Apparatus for indicating the magnitude of a condition which will be effective to vary the impedance of an electric circuit comprising a measuring circuit including a variable capacitive reactance element responsive to changes in the magnitude of the condition, a fixed inductive reactance element positioned closely adjacent to said capacitive element, a variable frequency oscillator disposed remote from said elements and connected thereto by conductors, said conductors and said elements being connected in series, the connection between said fixed reactance element and said capacitive element being short as compared with the length of said conductors connecting said elements jointly with said variable frequency oscillator, so as to minimize line losses at this point, means including said reactance elements and connections in said oscillator for restricting the frequency of oscillation of said oscillator to the resonant frequency of said reactance elements, said frequency being a measure of the magnitude of the condition, and indicating means responsive to the frequency of oscillation to indicate the magnitude of the condition.

7. Apparatus for indicating the magnitude of a condition which will be effective to vary the impedance of an electric circuit, comprising a measuring circuit including a variable inductive reactance element responsive to changes in the magnitude of the condition, a fixed capacitive reactance element positioned closely adjacent to said inductive reactance element, a variable frequency oscillator disposed remote from said measuring circuit and connected thereto by conductors connecting said inductive and said capacitive elements in series, the connection between said inductive and said capacitive elements being short as compared with the length of said conductors connecting said elements jointly with said oscillator, so as to minimize line losses at this point, means including said reactance elements and connections in said oscillator for restricting the frequency of oscillation of said oscillator to the resonant frequency of said reactance elements, said frequency being a measure of the magnitude of the condition, and indicating means responsive to the frequency of oscillation to indicate the magnitude of the condition.

8. A gauge for indicating remotely the magnitude of a condition, including a first variable reactance element responsive to changes in the magnitude of said condition, a second reactance element of opposite sign and having a fixed value and positioned adjacent said first element, a variable frequency oscillator positioned remotely with respect to said elements and adjacent to a place where an indication of the magnitude of the condition is to be indicated, a circuit connecting said first and second elements in series and including a cable connecting said elements to said oscillator, said oscillator being under the control of said elements and generating a signal substantially at the series resonant frequency of said first and second elements, and means for translating said series resonant frequency into an indication of the magnitude of said condition.

9. A gauge for indicating remotely the value of a condition including a first variable reactance element responsive to changes in said condition, a second reactance element of opposite sign and having a fixed value and positioned adjacent to said first element, a circuit connecting said first and second elements in series and including a connecting cable, a variable frequency oscillator connected to said cable and under the control of said elements to generate a frequency corresponding to the series resonant frequency of said first and second elements, circuit means including said reactance elements to supress oscillation of said oscillator at frequencies other than the resonant frequency of said reactance elements and a discriminator connected to said oscillator for measuring the frequency generated thereby to measure the value of said condition.

10. A gauge for indicating remotely the value of a condition including a first variable reactance element responsive to changes in said condition, a second reactance element of opposite sign and having a fixed value and positioned adjacent to said first element, an indicator positioned remotely with respect to said elements, and a circuit connecting said first and second elements in series and including a cable connecting said elements to said indicator, said indicator including a variable frequency oscillator having a feed-back circuit, said first and second elements and said cable being connected to said feed-back circuit to suppress oscillation of said oscillator at frequencies other than the resonant frequency of said elements while permitting oscillation of said oscillator at the resonant frequency of said elements, whereby said oscillator generates a signal, the frequency of which is a measure of the value of said condition.

11. Apparatus for indicating the magnitude of a condition which will be effective to vary the impedance of an electric circuit including a first variable reactance element responsive to changes in the magnitude of the condition, a second reactance element of predetermined value having opposing electrical characteristics disposed closely adjacent said first reactance element, an indicator connected to said first and second reactance elements, said indicator including a variable frequency oscillator, circuit means constituting a positive feedback tending to sustain oscillation in said oscillator, a negative feedback circuit for said oscillator incorporating said first and second reactance elements for suppressing the oscillation of said oscillator except at the resonant frequency of the first and second reactance elements, said frequency being a measure of the magnitude of said condition.

12. A gauge for indicating remotely the magnitude of a condition, including a first variable reactance element responsive to changes in said condition, a second reactance element of opposite sign and having a fixed value and positioned adjacent to said first element, a circuit connecting said first and second elements in series and including a connecting cable, a variable frequency oscillator connected to said cable and including a vacuum tube, a positive feedback circuit connected to said tube and tending to produce oscillation therein, and a negative feedback circuit connected to said tube and tending to prevent oscillation therein, said cable and said first and second reactance elements being connected in series and to said negative feedback circuit and suppressing the action thereof at the series resonant frequency of said elements, and means responsive to the frequency of said oscillator for indicating the magnitude of said condition.

13. Apparatus for indicating the magnitude of a condition which will be effective to vary the impedance of an electric circuit comprising a variable reactance element responsive to changes in the magnitude of the condition in series with an adjacent reactance element of opposing electrical characteristics which have a predetermined value, a variable frequency oscillator having included therein a positive feedback circuit tending to produce and maintain oscillation, and a negative feedback circuit tending to prevent oscillation, said reactance elements connected to said negative feedback circuit and disposed to suppress the action thereof at the series resonant frequency of said reactance elements, whereby said oscillator oscillates at said series resonant frequency, and indicating means responsive to said frequency, said frequency being a measure of the magnitude of said condition.

14. A gauge for indicating remotely the value of a condition including a first variable reactance element responsive to changes in said condition, a second reactance element of opposite sign and positioned near said first element, a cable connected in series with said elements, a remotely-positioned variable frequency oscillator comprising a vacuum tube, a positive feedback circuit connected to said tube and tending to produce oscillation therein, and a negative feedback circuit connected to said tube and tending to prevent oscillation therein, said cable with said elements in series therewith being connected to said negative feedback circuit and suppressing the action thereof at the series resonant frequency of said reactance elements, and a frequency measuring device comprising a first resonant circuit, a second resonant circuit having a resonant frequency different from that of said first circuit, said resonant circuits being coupled to said oscillator, first and second rectifiers having anode and cathode circuits and connected respectively to said first and second resonant circuits, and a ratiometer having first and second coils connected respectively to said first and second rectifiers.

15. Apparatus for indicating the magnitude of a condition which will be effective to vary the impedance of an electric circuit comprising a variable reactance element responsive to changes in the magnitude of the condition in series with an adjacent reactance element of opposing electrical characteristics which have a predetermined value, a variable frequency oscillator having included therein a positive feedback circuit tending to produce and maintain oscillation, and a negative feedback circuit tending to prevent oscillation, said reactance elements connected to said negative feedback circuit and disposed to suppress the action thereof at the series resonant frequency of said reactance elements, whereby said oscillator oscillates at said series resonant frequency, and a frequency measuring device comprising a first resonant circuit, a second resonant circuit having a resonant frequency different from that of the first resonant circuit, said resonant circuits being coupled to said oscillator, first and second rectifiers connected respectively to said first and second resonant circuits and a ratiometer having first and second coils connected respectively to said first and second rectifiers.

16. Apparatus responsive to the magnitude of a condition for generating an alternating signal, the frequency of which is a predetermined function of said magnitude, comprising a measuring circuit including a capacitive reactance element, an inductive reactance element connected in series with said capacitive reactance element, one of said reactance elements being variable as a predetermined function of the magnitude of said condition, and the other of said reactance elements being fixed, at least during the normal use of the apparatus; a variable frequency oscillator connected to said measuring circuit and including at least one vacuum tube, each said tube having a cathode, an anode and a grid, a source of D. C. power having positive and negative terminals, means electrically connecting the anode of each said tube to the positive terminal of said power source, means providing positive feedback tending to sustain oscillation in said oscillator, means providing negative feedback tending to suppress oscillation in said oscillator, said negative feedback providing means having a high impedance relative to the impedance of said measuring circuit at the resonant frequency of said measuring circuit, and means connecting said series connected reactance elements in parallel with said negative feedback providing means; said apparatus being so constructed and arranged that said oscillator will generate an alternating signal at the resonant frequency of said measuring circuit, such that the frequency of said alternating signal will be a predetermined characteristic function of the magnitude of said condition.

17. Apparatus responsive to the magnitude of a condition for generating an alternating signal, the frequency of which is a predetermined function of said magnitude, comprising a measuring circuit including a capacitive reactance element, an inductive reactance element connected in series with said capacitive reactance element, one of said reactance elements being variable as a predetermined function of the magnitude of said condition, and the other of said reactance elements having a fixed value; a variable frequency oscillator connected to said measuring circuit and including at least one triode, each said triode having a cathode, an anode and a grid, a source of D. C. power having positive and negative terminals, said negative terminal being grounded, means electrically connecting the anode of each said triode to said positive terminal of said power source, means providing positive feedback tending to sustain oscillation in said oscillator and including a capacitor, means providing negative feedback tending to suppress oscillation in said oscillator and including a resistor, means electrically connecting a point on said resistor to ground so as to ground one side of said negative feedback providing means, said negative feedback providing means having a high impedance relative to the impedance of said measuring circuit at the resonant frequency of said measuring circuit, means connecting said series connected reactance elements in series between the ungrounded side of said negative feedback providing means and ground; said apparatus being so constructed and arranged that said oscillator will generate an alternating signal at the resonant frequency of said measuring circuit, such that the frequency of said alternating signal will be a predetermined characteristic function of the magnitude of said condition.

18. Apparatus responsive to the magnitude of a condition for generating an alternating signal, the frequency of which is a predetermined function of said magnitude, comprising a measuring circuit including a capacitive reactance element, an inductive reactance element connected in series with said capacitive reactance element, one of said reactance elements being variable as a predetermined function of the magnitude of said condition, and the other of said reactance elements having a fixed value, at least during the normal use of the apparatus; a variable frequency oscillator connected to said measuring circuit and including first and second vacuum tubes, each having a cathode, an anode and a grid, a source of D. C. power having positive and negative terminals, means electrically connecting positive terminal of said power source to the anode of said second tube, means including a series connected resistor for electrically connecting said positive terminal of said power source to the anode of said first tube, means providing positive feedback tending to sustain oscillation in said oscillator, said positive feedback providing means including means electrically connecting the cathode of said first tube and the cathode of said second tube to ground, the last named means including a common bias resistor, and said positive feedback providing means further including means electrically connecting the anode of said first tube to the grid of said second tube; means providing negative feedback tending to suppress oscillation in said oscillator, said negative feedback providing means including a condenser connected between a point on said series connected resistor and the grid of said first tube, and a grid return resistor connected between the grid of said first tube and ground, said negative feedback providing means having a high impedance relative to the impedance of said measuring circuit at the resonant frequency of said measuring circuit, and means connecting said series connected reactance elements in series between the grid of said first tube and ground in parallel with said grid return resistor; said apparatus being so constructed and arranged that said oscillator will generate an alternating signal at the resonant frequency of said measuring circuit, such that the frequency of said alternating signal will be a predetermined characteristic function of the magnitude of said condition.

19. Apparatus responsive to the magnitude of a condition for generating an alternating signal, the frequency of which is a predetermined function of said magnitude, comprising a measuring circuit including a capacitive reactance element, an inductive reactance element connected in series with said capacitive reactance element, one of said reactance elements being variable as a predetermined function of the magnitude of said condition, and the other of said reactance elements having a fixed value; a variable frequency oscillator connected to said measuring circuit and including first and second triodes, each having a cathode, an anode and a grid, a source of D. C. power having positive and negative terminals, said negative terminal being grounded, a conductor electrically connecting the positive terminal of said power source to the anode of said second triode, means electrically connecting the anode of said second triode to the anode of said first triode, a resistor and a first potentiometer type resistance element connected in series in the connection aforesaid between the anodes of said triodes, said resistor being between the anode of said second triode and said first potentiometer type resistance element; means providing positive feedback tending to sustain oscillation in said oscillator, said positive feedback providing means including a common bias resistor and means electrically connecting the cathodes of said triodes together and thence through said bias resistor to ground, and said positive feedback providing means further including a coupling condenser, a second potentiometer resistance element connected in series with said coupling condenser, means connecting said coupling condenser to the anode of said first triode, means connecting the end of said second potentiometer resistance element remote from said coupling condenser to ground, and means connecting the grid of said second triode to a variable tap on said second potentiometer resistance element; means providing a negative feedback path tending to suppress oscillation in said oscillator, said negative feedback path including a condenser connected between a variable tap on said first potentiometer type resistance element and the grid of said first triode, and a grid return resistor connected between the grid of said first triode and ground, said grid return resistor having a high impedance relative to the impedance of said measuring circuit at the resonant frequency of said measuring circuit, and means connecting said series connected reactance elements in series between the grid of said first triode and ground in parallel with said grid return resistor; said apparatus being so constructed and arranged that said oscillator will generate an alternating signal at the resonant frequency of said measuring circuit, such that the frequency of said alternating signal will be a predetermined characteristic function of the magnitude of said condition.

20. Apparatus responsive to the magnitude of a condition for generating an alternating signal, the frequency of which is a predetermined function of said magnitude, comprising a measuring circuit including a capacitive reactance element, an inductive reactance element connected in series with said capacitive reactance element, one of said reactance elements being variable as a predetermined function of the magnitude of said condition, and the other of said reactance elements having a fixed value, at least during the normal use of the apparatus; a variable frequency oscillator connected to said measuring circuit and including first and second vacuum tubes, each having a cathode, an anode and a grid, a source of D. C. power having positive and negative terminals, means electrically connecting the anode of said first tube to the grid of said second tube, means including a series connected resistor electrically connecting the anode of said second tube to said positive terminal of said power source, means providing a positive feedback path tending to sustain oscillation in said oscillator, said path including a coupling condenser connected between a point on said means connecting the anode of said second tube with said positive terminal and the grid of said first tube; means providing a negative feedback path tending to suppress oscillation in said oscillator, said negative feedback path including a bias resistor connected between the cathode of said first tube and ground, said negative feedback path having a high impedance realtive to the impedance of said measuring circuit at the resonant frequency of said measuring circuit, and means connecting said series connected reactance elements in series between the cathode of said first tube and ground in parallel with said bias resistor; said apparatus being so constructed and arranged that said oscillator will generate an alternating signal at the resonant frequency of said measuring circuit, such that the frequency of said alternating signal will be a predetermined characteristic function of the magnitude of said condition.

21. Apparatus responsive to the magnitude of a condition for generating an alternating signal, the frequency of which is a predetermined function of said magnitude, comprising a measuring circuit including a capacitive reactance element, an inductive reactance element connected in series with said capacitive reactance element, one of said reactance elements being variable as a predetermined function of the magnitude of said condition, and the other of said reactance elements having a fixed value; a variable frequency oscillator connected to said measuring circuit and including first and second triodes, each having a cathode, an anode and a grid, a source of D. C. power having positive and negative terminals, said negative terminal being grounded, means electrically connecting the anode of said first triode to the grid of said second triode, a first plate load resistor and a condenser connected in series in said connecting means between the first triode anode and the second triode grid, a second plate load resistor connected from a point between said first plate load resistor and said condenser to said positive terminal of said power source, means including a third plate load resistor and a potentiometer type resistance element connected in series between the anode of said second triode and the positive terminal of said power source, means including a by-pass condenser of low value electrically connecting the anode of said second triode to ground, means including first and second series connected resistors electrically connecting the cathode of said second triode to ground, a capacitor and a series connected resistor electrically shunting said first and second resistors, a grid return resistor connecting the grid of said second triode to a point between said first and second resistors, means providing a positive feedback path tending to sustain oscillation in said oscillator, said positive feedback path including a coupling condenser connected between a variable tap on said potentiometer type resistance element and the grid of said first triode, means including a grid return resistor for electrically connecting the grid of said first triode to ground; means providing a negative feedback path tending to suppress oscillation in said oscillator, said negative feedback path including a bias resistor connected in series between the cathode of said first triode and ground, said bias resistor having a high impedance relative to the impedance of said measuring circuit at the resonant frequency of said measuring circuit, and means connecting said series connected reactance elements in series between the cathode of said first triode and ground in parallel with said bias resistor; said apparatus being so constructed and arranged that said oscillator will generate an alternating signal at the resonant frequency of said measuring circuit, such that the frequency of said alternating signal will be a predetermined characteristic function of the magnitude of said condition.

22. Apparatus responsive to the magnitude of a condition for generating an alternating signal, the frequency of which is a predetermined function of said magnitude, comprising a measuring circuit including an inductive reactance element, a capacitive reactance element connected in series with said inductive reactance element, one of said reactance elements being variable as a predetermined function of the magnitude of said condition, and the other of said reactance elements having a fixed value, at least during the normal use of the apparatus; a variable frequency oscillator connected to said measuring circuit and including first and second vacuum tubes, each having a cathode, an anode and a grid, a source of D. C. power having positive and negative terminals, means electrically connecting said positive terminal of said power source to the anodes of said tubes, means electrically connecting the anode of said first tube to the grid of said second tube, means providing positive feedback tending to sustain oscillation in said oscillator, said positive feedback providing means including a series connected condenser and resistor for electrically connecting the cathode of said second tube to the cathode of said first tube, wherein said condenser is connected to the cathode of said second tube and said resistor is connected to the cathode of said first tube, means electrically connecting the grid of said first tube to a reference point, means connecting ground to a point between said condenser and said resistor; means providing a negative feedback path tending to suppress oscillation in said oscillator, said negative feedback path including a resistor connected between said reference point and a point on said means connecting ground to the point between said condenser and the first named resistor, said negative feedback path having a high impedance relative to the impedance of said measuring circuit at the resonant frequency of said measuring circuit; and means connecting said series connected reactance elements in series between said reference point and ground; said apparatus being so constructed and arranged that said oscillator will generate an alternating signal at the resonant frequency of said measuring circuit, such that the frequency of said alternating signal will be a predetermined characteristic function of the magnitude of said condition.

23. Apparatus responsive to the magnitude of a condition for generating an alternating signal, the frequency of which is a predetermined function of said magnitude, comprising a measuring circuit including an inductive reactance element which is variable as a predetermined function of the magnitude of said condition, a fixed value capacitive reactance element connected in series with said inductive reactance element; a variable frequency oscillator connected to said measuring circuit and including first and second triodes, each having a cathode, an anode and a grid, a source of D. C. power having positive and negative terminals, said negative terminal being grounded, a conductor electrically connecting the positive terminal of said power source to the anode of said second triode, means including a load resistor for electrically connecting the anode of said first triode to said positive terminal of said power source, means including a first condenser for electrically connecting the anode of said first triode to the grid of said second triode, a voltage-divider means including two resistors connected in series across the terminals of said power source, a conductor connected from a point between said two resistors to the grid of said second triode, means including a third resistor for electrically connecting the cathode of said second triode to ground; means providing positive feedback path tending to sustain oscillation in said oscillator, said path including means electrically connecting the cathode of said second triode to the cathode of said first triode and including in series in the following order, a connection to the cathode of said second triode, a second condenser, a first reference point, a fourth resistor, and a connection to the cathode of said first triode; means including a potentiometer type resistance element connected between said first reference point and ground, means including a cathode bias resistor for electrically connecting the cathode of said first triode to ground, means including a grid resistor for electrically connecting the grid of said first triode to ground, means including a capacitor for electrically connecting the grid of said first triode to a second reference point; means providing a negative feedback path tending to suppress oscillation in said oscillator, said negative feedback path including a resistor and a condenser connected in parallel with each other and jointly electrically connecting said second reference point to a variable tap of said potentiometer type resistance element, said negative feedback path having a high impedance relative to the impedance of said measuring circuit at the resonant frequency of said measuring circuit, and means connecting said series connected reactance elements in series between said second reference point and ground; said apparatus being so constructed and arranged that said oscillator will generate an alternating signal at the resonant frequency of said measuring circuit, such that the frequency of said alternating signal will be a predetermined characteristic function of the magnitude of said condition.

24. Apparatus responsive to the magnitude of a condition for generating an alternating signal the frequency of which is a predetermined function of said magnitude, comprising a measuring circuit including a capacitive reactance element, an inductive reactance element connected in series with said capacitive reactance element, one of said reactance elements being variable as a predetermined function of the magnitude of said condition, and the other of said reactance elements having a fixed value, at least during the normal use of the apparatus; a variable frequency oscillator connected to said measuring circuit and including a vacuum tube having a cathode, an anode and a grid, a source of D. C. power having positive and negative terminals, means electrically connecting the positive terminal of said power source to the anode of said tube, means providing a positive feedback path tending to sustain oscillation in said oscillator, said positive feedback path including means electrically connecting the anode of said tube to the grid of said tube, a condenser and an inductor connected in series in said path; means providing a negative feedback path tending to suppress oscillation in said oscillator, said negative feedback path including a cathode resistance element connected between the cathode of said tube and ground, said negative feedback path having a high impedance relative to the impedance of said measuring circuit at the resonant frequency of said measuring circuit, and means connecting said series connected reactance elements in series between the cathode of said tube and ground; said apparatus being so constructed and arranged that said oscillator will generate an alternating signal at the resonant frequency of said measuring circuit, such that the frequency of said alternating signal will be a predetermined characteristic function of the magnitude of said condition.

25. Apparatus responsive to the magnitude of a condition for generating an alternating signal, the frequency of which is a predetermined function of said magnitude, comprising a measuring circuit including a capacitive reactance element, an inductive reactance element connected in series with said capacitive reactance element, one of said reactance elements being variable as a predetermined function of the magnitude of said condition, and the other of said reactance elements having a fixed value; a variable frequency oscillator connected to said measuring circuit and including a triode having a cathode, an anode and a grid, a source of D. C. power having positive and negative terminals, said negative terminal being grounded, means including a load resistor for electrically connecting the positive terminal of said power source to the anode of said triode, means providing a positive feedback path tending to sustain oscillation in said oscillator, said path including in series in the following order, a connection from the anode of said triode, a condenser, an autotransformer having a grounded variable tap and a portion of a potentiometer type resistance element having a variable tap and the remote end of which is connected to ground, and a connection from the variable tap of said potentiometer element to the grid of said triode; means providing a negative feedback path tending to suppress oscillation in said oscillator, said negative feedback path including a cathode resistance connected between the cathode of said triode and ground, said cathode resistance having a high impedance relative to the impedance of said measuring circuit at the resonant frequency of said measuring circuit; and means connecting said series connected reactance elements in series between the cathode of said triode and ground; said apparatus being so constructed and arranged that said oscillator will generate an alternating signal at the resonant frequency of said measuring circuit such that the frequency of said alternating signal will be a predetermined characteristic function of the magnitude of said condition.

CARL G. SONTHEIMER.

REFERENCES CITED

The following references are of record in the file of this patent:

UNITED STATES PATENTS

| Number | Name | Date |
|---|---|---|
| 1,076,448 | Pratt | Oct. 21, 1913 |
| 1,156,491 | Price | Oct. 12, 1915 |
| 2,071,564 | Nicolson | Feb. 23, 1937 |
| 2,146,073 | Jennens et al. | Feb. 7, 1939 |
| 2,260,933 | Cooper | Oct. 28, 1941 |
| 2,280,678 | Waymouth | Apr. 21, 1942 |
| 2,307,316 | Wolff | Jan. 5, 1943 |
| 2,361,173 | Browne | Oct. 24, 1944 |
| 2,409,073 | Sias | Oct. 8, 1946 |
| 2,419,869 | Young | Apr. 29, 1947 |
| 2,457,727 | Rifenbergh | Dec. 28, 1948 |

FOREIGN PATENTS

| Number | Country | Date |
|---|---|---|
| 385,265 | Great Britain | Mar. 13, 1931 |